Aug. 3, 1965 P. M. G. TOULON 3,198,880

PHOTOGRAPHIC DISC REPRODUCTION OF TELEVISION SIGNALS

Original Filed Sept. 3, 1952 2 Sheets-Sheet 1

INVENTOR

Pierre Marie Gabriel Toulon

BY Morse & Hall

ATTORNEYS

PHOTOGRAPHIC DISC REPRODUCTION OF TELEVISION SIGNALS

Original Filed Sept. 3, 1952

2 Sheets-Sheet 2

INVENTOR

Pierre Marie Gabriel Toulon

BY Moore & Hall

ATTORNEYS

United States Patent Office 3,198,880
Patented Aug. 3, 1965

3,198,880

PHOTOGRAPHIC DISC REPRODUCTION OF TELEVISION SIGNALS

Pierre Marie Gabriel Toulon, New York, N.Y., assignor, by mesne assignments, to William D. Hall, Elliott I. Pollock, and George Vande Sande, Washington, D.C., a partnership Original application Sept. 3, 1952, Ser. No. 307,607, now Patent No. 2,972,660, dated Feb. 21, 1961. Divided and this application Feb. 20, 1961, Ser. No. 92,117
6 Claims. (Cl. 178—6.7)

This application is a division of my prior copending application Serial No. 307,607 filed September 3, 1952 entitled "Frequency Adjustment System," now U.S. Patent 2,972,660 granted February 21, 1961. The aforesaid application disclosed a frequency adjustment system and a television record. The present application is addressed to the television record subject matter.

The invention relates in particular to apparatus for the reproduction of visual programs with accompanying sound from storage means in the form of a disc record, films or the like, capable of being scanned to produce a program similar to the home television receiver.

The main object of this invention is to provide a television record and apparatus for playing the same.

An important object of the invention is to provide a television record together with a player therefor which is low in cost and hence suitable for use in the home.

Yet another object is to provide a television record and player therefor useful to provide signals to a home television receiver.

In carrying out the above objects, the invention in its preferred form embodies a disc shaped transparent record having a spiral track. Running crosswise of the spiral track are substantially parallel lines each made up of a series of dots of varying intensities, each parallel line representing one horizontal line of the raster of the television picture. These parallel lines are each about 1½ mm. long and have about 600 dots. These lines are scanned in succession by optical means and the output is a video signal which may be fed to a home television system.

In the drawings like numerals refer to like parts throughout.

Figure 1:
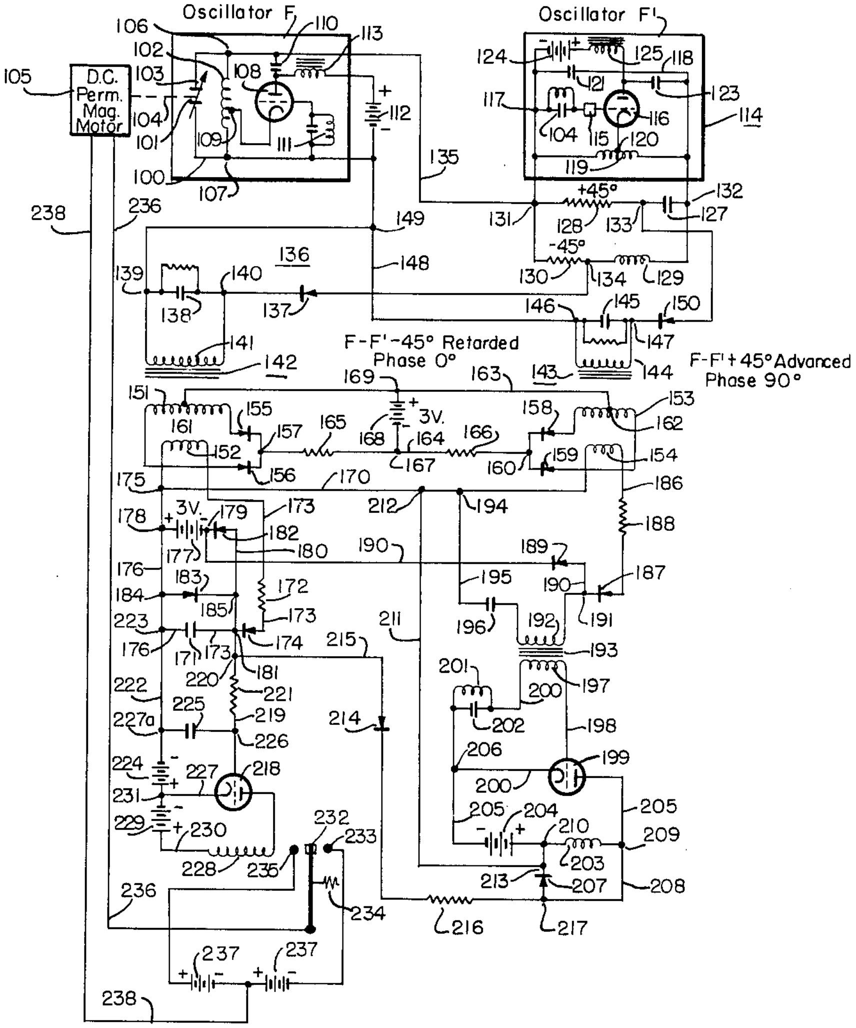
FIG. 1 is a schematic circuit diagram of a general form of the invention.

Before setting forth the full detailed explanation of the system of FIG. 1, a generalized and simplified explanation will be presented.

The automatic frequency control system of this invention adjusts the frequency of an oscillator toward a fixed value. This fixed value is established by another oscillator. The frequency of oscillator F is urged from either a higher or a lower frequency towards the same frequency as that of fixed oscillator F'. The system for producing this effect operates as follows: The signal from oscillator F' is divided into two separate signals which are about ninety degrees apart in phase. Signal from oscillator F is mixed with each of these separate phase signals, and each mixed signal is rectified. The outputs of the two rectifiers provide beat notes at the same difference frequency, F minus F', but the phases of the two difference frequency signals are also about ninety degrees apart. When the variable frequency F is greater than the reference frequency F', the signal across transformer primary 141 leads the signal across transformer primary 144, otherwise it lags it.

Condenser 171 is charged by rectifier 174, which is energized from the retarded phase secondary 152. Condenser 171 is discharged by rectifier 214, which is energized from the advance phase secondary 154. When frequency F is higher than frequency F' the discharge of condenser 171 follows the charge promptly, so that the condenser is only charged one quarter of the time, but when frequency F is lower than frequency F' the discharge precedes the charge, so that the charge is present on condenser 171 three quarters of the time. When frequency F is the same as frequency F', no difference frequency voltage is generated, and neither secondary is energized. The voltage across condenser 171 is then constant and at a fixed intermediate value. This value is based upon the leakage of the rectifiers 174 and 183 of one polarity balancing the leakage in the other direction of rectifier 214 of the other polarity.

Condenser 225 is charged by condenser 171 through resistor 231. Whether condenser 225 charges up to three quarters or one quarter of the peak potential in condenser 171 depends upon whether the peak is present three quarters or one quarter of the time.

The voltage across condenser 225 is applied to the grid of tube 213. When the plate current of tube 213 is of an intermediate value the magnetic pull on armature 232 balances the spring 234 and both contacts 233 and 235 are open. If condenser 225 is charged to a low value, contact 233 closes, operating motor 105 to rotate shaft 104 of condenser 101 to decrease the frequency of oscillator F.

Limiters, consisting of battery 177 and rectifier 182 on the one hand, and battery 177 and rectifier 189 on the other hand, limit the peak voltages of secondaries 152 and 154 respectively to three volts, thereby generating square waves in the secondary circuits for application to condenser 171.

Windings 151 and 153 on transformers 142 and 143 respectively, operate as part of limiter circuits. A three-volt battery 168 opposes conduction of either rectifier 155 or 156 across winding 151, and similarly, opposes conduction through rectifiers 158 and 159 across secondary 153. This system not only equalizes the energy supplied from the primaries to the respective secondaries, but also diverts excessive flux in the transformers so that no more than a predetermined amount can reach the secondary windings.

Rectifier 207 prevents the voltage across inductance 203 from reversing. Rectifier 183 prevents condenser 171 from discharging beyond zero volts as it otherwise might through rectifier 214. The details of the connections and operation of this circuit will now be described.

FIG. 1 shows a circuit arrangement for the automatic adjustment of a variable or potentially variable radio frequency to the same or substantially the same frequency, depending upon the order of magnitude involved, as a reference frequency which may be standard or itself adjustable manually to produce a desired result such as adjusting the position of a lens for focusing. The device may be used to adjust the capacitance of a condenser.

Variable frequency F of oscillator F has value which corresponds to the resonant frequency of the tank circuit 100 comprising variable condenser 101 and inductance coil 102. The control rod of variable condenser 101 is connected to the shaft 104 of permanent field magnet D.C. motor 105. An oscillation sustaining tube or valve 108 is connected across junctions 106 and 107 of tank 100 and comprises an anode connected to junction 106 through condenser 110, a cathode connected to tap point 109 on inductance coil 102 and a grid connected to junction 107 through tank 111. A plate battery 112 has its positive terminal connected to the plate of valve 108 through load coil 113 and its negative terminal connected to the grid at terminal 107. The resonant frequency of tank 100 is of the order of a hundred megacycles per second.

Standard or control oscillator 114 also has a frequency of a hundred megacycles per second or a wave length of about three meters. Oscillator 114 comprises a quartz crystal or equivalent means 115 connected to the grid of driving tube 116 and to junction 117 of tank 118 through tank 104*a*. Tank circuit 118 comprises a coil 119 with its midpoint 120 connected to the cathode of tube 116 and a condenser 121 across junctions 117 and 122. The plate of tube 116 is connected to junction 122 through condenser 123 and to the positive terminal of plate battery 124 through load coil 125. The negative terminal of plate battery 124 is connected to junction 117.

A phase shift circuit 126 comprises a condenser 127 in series with a resistor 128 and a coil 129 in series with resistor 130 connected in parallel at junctions 131 and 132 which are connected respectively to junctions 117 and 122 of tank circuit 118. A junction 133 is provided between condenser 127 and resistor 128 and a similar junction 134 is provided between coil 129 and resistor 130.

Junction 131 of phase shift circuit 126 is connected to junction 106 of tank 100 by wire 135. A demodulator 136 comprises a rectifier 137 in series with condenser 138 and its shunt resistor connected across the terminals 139 and 140 of primary 141 of transformer 142. A corresponding transformer 143 has its primary 144 connected across a condenser 145 and paralleled resistor to terminals 146 and 147. Junction 146 is connected to junctions 107 and 139 by wire 148 at junction 149. Junction 147 is connected to junction 133 through demodulating rectifier 150.

It will be noted that a voltage with a frequency of F will appear across junctions 149 and 131. Another voltage with a frequency of F′ will appear across junctions 131 and 132. Condenser 127 is so chosen that the voltage across resistor 128 is advanced in phase by forty-five degrees. The inductance of coil 129 is so chosen that the voltage F′ across resistance 130 is retarded in phase by forty-five degrees. The voltage F across junctions 131 and 149 is combined with the voltage F′ advanced in phase forty-five degrees across resistance 128, demodulated by rectifier 150 and applied across terminals 146 and 147 of primary 144 of transformer 143. The same voltage F across junctions 131 and 149 is combined with the voltage F′ retarded in phase forty-five degrees across resistance 130, demodulated by rectifier 137 and applied across terminals 139 and 140 of primary 141 of transformer 142. Primary 141 receives the envelope or demodulated beat frequency of F–F′ retarded so as to pass through the origin at zero time. Primary 144 receives the envelope or demodulated beat frequency of F–F′ leading the voltage across primary 141 by ninety degrees.

Transformers 142 and 143 have double secondaries 151, 152 and 153, 154 respectively. Of these secondaries 151 and 153 act as voltage limiters to limit the voltage to a three volt maximum. Secondary 151 has its terminals connected to rectifiers 155 and 156 which are joined at junction 157. Secondary 153 has its terminals connected to rectifiers 158 and 159 which are joined at junction 160. The midpoints 161 and 162 of secondaries 151 and 153 are connected by wire 163. Junctions 157 and 160 are connected by wire 164 having resistors 165 and 166 with junction 167 there-between. A three volt battery 168 has its negative terminal connected to junction 167 and its positive terminal connected to junction 169 with wire 163. Secondaries 151 and 153 function to limit the voltage to a maximum amplitude of three volts over a wide range of phase, e.g. whether the frequency is ten kilocycles or ten megacycles.

The lagging envelope or rectified signal in primary 141 and the corresponding leading signal in primary 144 are reproduced in secondaries 152 and 154 respectively connected in opposing relation by wire 170. Secondary 152 is connected across condenser 171 through resistor 172 and rectifier 174 in wire 173 and wire 176 leading from junction 175 with wire 170. A three volt battery 177 has its positive terminal connected to junction 178 with wire 176. The negative terminal 179 of battery 177 is connected across condenser 171 through rectifier 182 by wire 180 connected to junction 181 with wire 173. Battery 177 and rectifier 182 limit the tank voltage of secondary 152 and condenser 171 to three volts. A second rectifier 183 is connected across condenser 171 in reversed direction at junctions 184 and 185 with wires 176 and 180 to permit the voltage of condenser 171 to go negative. Condenser 171 is charged by each beat of the rectified envelope signal through rectifier 174.

Secondary 154 is connected by wire 186 containing resistance 188 to rectifier 187 which gives half waves. A second rectifier 189 is connected by wire 190 across negative terminal 179 of battery 177 and the other terminal of rectifier 187 at junction 191. The primary 192 of transformer 193 is connected to junction 191 and to junction 194 with wire 170 by wire 195 containing condenser 196. Rectifier 189 limits the amplitude of the half wave produced by rectifier 187.

The limited square wave produced by rectifiers 187 and 189 is amplified to yield two oppositely peaked voltages. Secondary 197 has one side connected by wire 198 to the grid of amplifier triode 199 and the other side connected to the cathode of tube 199 by wire 200 containing inductance 201 and condenser 202 in parallel. The amplifying circuit comprises an inductance 203 and plate battery 204 connected across the plate and cathode of tube 199 by wire 205 leading to junction 206 with wire 200. A rectifier 207 for suppressing the negative peak is connected across inductance 203 by wire 208 leading from junction 209 to junction 210. Wire 211 connects junction 212 on wire 170 to junction 213 on wire 208. Condenser 171 is discharged by rectifier 214 connected by wire 215 containing resistance 216 between junction 217 with wire 208 and junction 181.

Condenser 171 is connected to the grid of tube 218 by a wire 219 leading from junction 220 with wire 215 and containing resistor 221. Wire 222 leads from junction 223 with wire 176 to the cathode of tube 218 through battery 224. A damping condenser 225 is connected across wires 219 and 222 at junctions 226 and 227, respectively. The plate circuit of tube 218 comprises a relay coil 228 and plate battery 229 connected by wire 230 to the plate and junction 231 with wire 222. Armature 232 is biased toward contact 233 by tension spring 234 and is drawn toward contact 235 by 228. Armature 232 is connected to one side of motor 105 by wire coil 236. Contacts 233 and 235 are connected across battery 237 having its mid tap connected with the other side of D.C. motor by wire 238.

In the operation of the above circuit it will be noted that although the form of the envelope obtained is the same as normal the order of the peaks of the two voltage curves depends upon whether F′ is higher or lower than F. F′ is separated into $f'_0$ and $f'_{90}$. If F′<F< the peak of the envelope of $f'_0$ occurs before $f'_{90}$. The opposite is true where F′>F when $f'_{90}$ comes first. These envelope peaks appear at transformers 142 and 143. The peak of the first $f'_0$ is used to charge condenser 171 to three volts on each beat through the rectifier 174 of the envelope minus forty-five degrees. The peak of $f'_{90}$ is fed to amplifier 199 et seq. and by a very accurate action at rectifier 214 discharges the condenser 171, condenser 225 serving as a damper. In the case of F′>F the duration of the charge on condenser 171 is three-quarters of the time interval and in the case of F′<F the duration is only one-quarter.

It follows that the average values of the two voltages are different by a factor of three. This differential value serves to determine the direction of rotation of motor 105 because of the differential effect on armature 232 biased by spring 234. In a home television reproducer using a transport record 300 as a picture source, shown schematically in FIG. 2, the coil 314 replaces the coil 228 of FIG. 1 and the motor 105 and circuitry 232 through 238 is eliminated. Tuning or focusing is achieved by the manual adjustment of condenser 104 until a sharp focus is obtained as explained below.

Figures 2, 3:
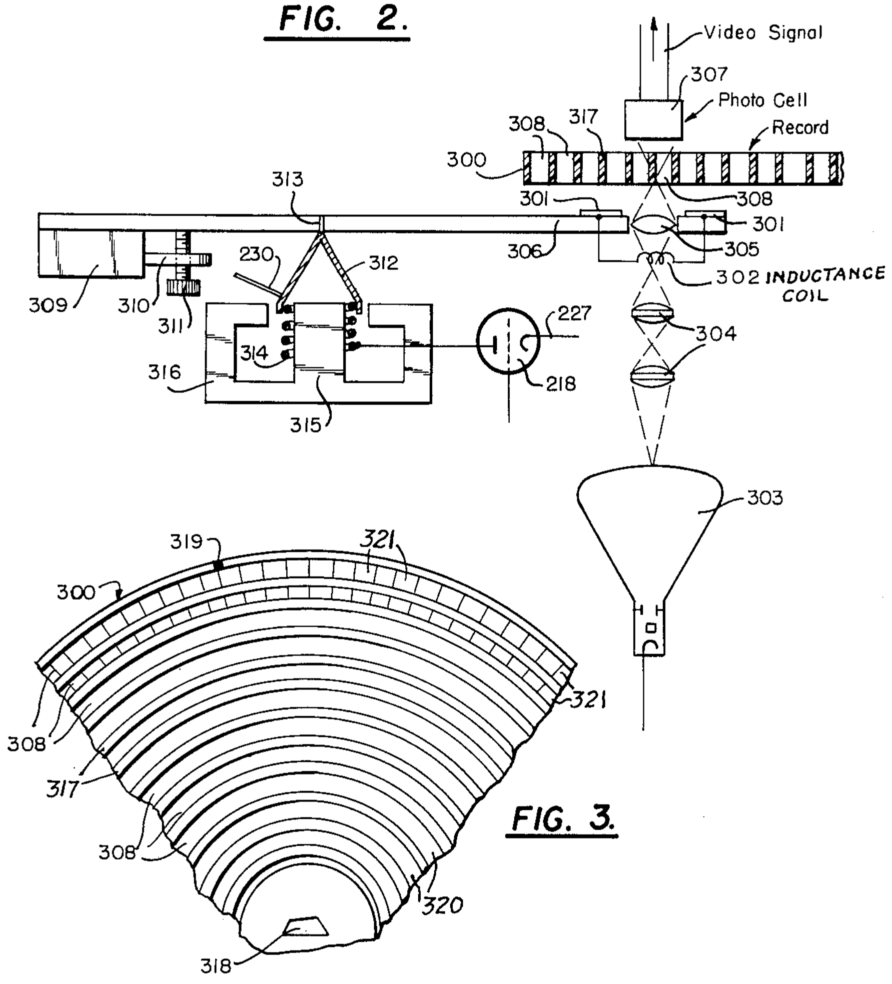
FIG. 2 is a detail showing an application of the invention of FIG. 1 to a television reproducer.
FIG. 3 is a plan view of one form of a television record having a spiral light value path storing video signals.

An application of the invention to the field of television with particular reference to the storing and reproduction of television programs is shown in FIG. 2.

In the structure of FIG. 2 a home television set is equipped to produce a program from a record 300 which resembles a phonograph record in general appearance. Record disc 300 is formed of a plastic base into which a glycerine acid has been introduced, it is both transparent and conductive. Record 300 has a spiralloid track somewhat like the groove in a sound record. The track comprises a path about one and a half milli-meters in width of grainless special photographic silver salt or similar material such as used in the Lippmann process forming a light valve. A flying spot sweeps across the 1½ mm. path picking up six hundred dot video signals from each horizontal line. A multiplier phototube is used for the necessary high definition.

For a discussion of the flying spot action reference is made to Principles of Television Engineering, pages 83–89, Fink, McGraw Hill, 1940 and Basic Television, pages 18, 19 and 34, Grob, McGraw Hill, 1949. See also Vacuum Tubes, sec. 19.10, Spangenberg, McGraw Hill, 1948.

The record 300 is mounted for rotation and also for movement bodily in translation. Where separate records are used for video and sound signals they are synchronized by suitable gearing, the sound record turning 33⅓ r.p.m. and the video record at 1½ r.p.m. This speed differential is allowed for on records carrying both sound and video signals. Such a construction is considered to be within the scope of the present invention.

Where the record carries the video signals only, without sound, the construction may be as shown schematically in FIGS. 2 and 3. The spiral light valve track of record 300 receives light from a small cathode ray tube 303 which in this case makes a line across the spiral track as the flying spot moves. A lens system 304 focuses the light on a movable lens 305 mounted on spring arm 306. Two condenser plates 301, corresponding to condenser 101, are placed on arm 306, one on each side of movable lens 305. An inductance 302, corresponding to inductance 102, is connected across the plates 301 to form a high "Q" tank circuit which contains just enough inherent resistance to make it sufficiently stable to yield optimum results. A multiplier photocell 307 is aligned with track 308 on the opposite of record 300 from scanning tube 303.

Alternatively, a source of light may be used in place of photocell 307 and a small camera tube such as a cathode ray flying spot scanner may be used in place of cathode ray scanning tube 303, in which case the video signal will be generated by the camera tube. This reversal of direction of intelligence flow with respect to storage record 300 is entirely within the spirit of the invention of the disclosure and is representative of the many variations in structure to achieve the same or equivalent results.

It will be seen that the conductive record 300 forms part of the electrical circuit of condenser 301 and that the effective capacity of condenser 301 and therefore the resonant frequency of the tank circuit 301–302 is a function of the distance between record 300 and condenser plates 301. It follows that the sharpness of focus of the flying spot on track 308 by lens 305 is also a function of this same distance. This structure can therefore be said to translate the distance of lens 305 from the film track 308 into the resonant frequency of tank circuit 300–302. The condenser 300, 301 is a variable condenser with two end plates 301, a middle plate comprising the conductive record 300 and the air space between the record 300 and the plates 301. As the distance $d$ across the air space changes the capacitance of the condenser 300–301 varies according to the relation $C=ka/4\pi d$, where $k$ is the dielectric constant for air, $a$ is the total effective area of plates 301 and that portion of record 300 opposite the plates 301 and $d$ is the distance between plates 301 and record 300.

Spring arm 306 is attached to mounting 309 which carries a projecting arm 310 and a set screw 311 which bears against arm 306 and affords means to make an initial setting of arm 306 and lens 305.

A cone 312 of aluminium, magnesium or other nonferrous metal of low mass is suspended from arm point 313 on arm 306 and supports coil 314 over the central post 315 of permanent magnet 316. Coil 314 may be substituted for coil 228 and motor 105 and elements 232 through 238 eliminated. The action on coil 314 is somewhat different and the coil 314 should be so connected that the voltage having the larger value opposes the action of gravity in those constructions where gravity is a factor. However, the spring constant of arm 306 and the mass of the system may be such as to make gravitational effects relatively unimportant and it may be desirable to bias cone 312 or arm 306 in the direction of the smaller value so as to balance the forces acting to move lens 305. It might be noted that the plate current of tube 218 passing through coil 228 (or coil 314) is substantially independent of the difference between F and F′ even if they are of different orders of magnitude. It will be understood that motor 105 and elements 232 through 238 were employed to disclose the general case of maintaining two frequencies the same and are normally to be replaced by the elements used to adapt the invention to a specific application of which the reproduction of visual programs is only one of many. The above arrangement could of course be readily adapted for use with motion picture film of either commercial or home movie size with or without an attached sound track.

The record of FIG. 3 is shown as a disc 300 having 1.5 mm spiral path 308 and a spiral space 317 between turns of about one tenth mm. in width. A central hole 318 of irregular outline, is used where separate records are used for video signals and sound so that their initial positions are fixed and automatically synchronized. Synchronism is maintained by gearing as mentioned above. The records 300 may of course be cylindrical or film.

In the television reproducer circuit of FIGS. 1 and 2 combined, condenser 104 or its paralleled inductance is adjustable by small increments by a knob or the like on a micrometer dial. If the reproducer is out of focus during operation condenser 104 is adjusted manually until lens 305 focuses accurately and an optimum picture is obtained. The circuit of FIG. 1 maintains the focus thereafter. The adjustment of arm 306 by set screw 311 is normally set at the factory and is not changed in normal tuning.

The record 300 and the separate sound track may be synchronized manually if desired and for this purpose may be supplied with a peripheral starting or positioning mark 319. A mark such as 319 may be placed on both video and sound records, film or the like. Sound control signals for synchronization may be impressed on opaque spiral portion 317, picked up and applied to the audio circuit as is now done for motion picture sound synchronization. With improved equipment spiral space 317 may carry the sound track corresponding to the video track 308. Such sound track may be single or of multiple parallel micro-groove paths. The use of multiple paths in parallel with corresponding pickup heads for each path permits the recording of two, three or more frequency ranges within the audible range which are selectively recorded on the parallel paths and combined to give full range sound. This arrangement permits full use of the space 317 and prevents undue crowding of the sound signals caused by the very slow speed of rotation of one and a half r.p.m.

The video track 308 may be continuous as shown at 320, each "frame" repeating itself without special demarcation other than synchronizing signals. The frames may be segregated as indicated at 321 if desired. Any distortion which may occur because of the spiral track approaching the center is allowed for by positioning and shape of the lines of each frame which change slightly as the center is approached. That is, if the signals are recorded on the record, in the same manner in which they are to be reproduced, on equipment with the same geometry, any correction is automatic without need of special compensation.

The record 309 may be made conductive by using a cobalt salt in the record composition itself or as a surface layer or coating.

While I have described what I at present consider the preferred embodiments of my invention, it will be obvious to those skilled in the art that various changes and modifications can be made therein without departing from my invention, and I, therefore, have used generic terminology in the appended claims to cover all such changes and modifications as fall within the true spirit and scope of my invention.

I claim:

1. A device for supplying video signals to a television receiver comprising a record having a series of substantially parallel lines respectively representing the lines of a television raster and having variations to represent those of the television picture, detecting means including a light source and light pick-up means for scanning the lines and generating a video signal varying according to the variations along the substantially parallel lines, a video output circuit connected to said light pick-up means, said video output circuit being adapted to be connected to a television receiver to deliver said video signals thereto, and means for successively advancing said record with reference to said detecting means so that said substantially parallel lines are scanned in sequence.

2. A device for supplying video signals to a television receiver as defined in claim 1 in which said record is transparent and said light source directs a light beam through the record and said light pick-up means is in the path of the light beam after it has passed through the record.

3. A device for supplying a video signal to a television receiver as defined in claim 2 in which the record is a disc and in which said substantially parallel lines are radial, are of short length as compared to the radius of the disc, and a line normal to said parallel lines forms a spiral path.

4. A device for supplying video signals to a television receiver as defined in claim 1 in which the record is a disc and in which said substantially parallel lines are radial and are of short length as compared to the radius of the disc, and a line normal to said parallel lines forms a spiral path.

5. A device for supplying video signals to a television receiver as defined in claim 1 including means for holding constant the distance between the record and at least some part of said detecting means.

6. In combination, a television receiver having a video input, a record having a series of substantially parallel lines each made up of a series of dots, detecting means including a light source and light pick-up means for scanning the parallel lines and generating a video signal varying according to variations in the dots along the parallel lines, means for feeding the video signal produced by said detecting means to said video input of said television receiver, and means for successively advancing said record with reference to said detecting means so that said substantially parallel lines are scanned in sequence of said detecting means.

References Cited by the Examiner

UNITED STATES PATENTS

| | | | |
|---|---|---|---|
| 1,363,903 | 12/20 | Neher | 274—39 |
| 2,005,914 | 6/35 | Freund | 178—6.6 |
| 2,297,443 | 9/42 | Von Ardenne | 178—7.5 |
| 2,357,938 | 9/44 | Dench | 178—6.7 |
| 2,513,176 | 6/50 | Homrighous | 178—6.7 XR |
| 2,629,784 | 2/53 | Daniels | 179—100.2 |
| 2,685,618 | 8/54 | Rettinger | 179—100.2 |
| 2,895,006 | 7/59 | Hall | 178—7.1 |

OTHER REFERENCES

Neblette, C. B.: Photography, page 43. New York, D. Van Nostrand Company, Inc., 1943.

DAVID G. REDINBAUGH, *Primary Examiner.*

NEWTON LOVEWELL, ROBERT SEGAL, *Examiners.*